C. L. HIBBARD.
PHONOGRAPH.
APPLICATION FILED NOV. 22, 1907.

1,119,157.

Patented Dec. 1, 1914.

Witnesses:
Frank D. Lewis
Delos Holden

Inventor:
Charles L. Hibbard
by Frank L. Brown
Atty.

C. L. HIBBARD.
PHONOGRAPH.
APPLICATION FILED NOV. 22, 1907.

1,119,157.

Patented Dec. 1, 1914.
5 SHEETS—SHEET 4.

UNITED STATES PATENT OFFICE.

CHARLES L. HIBBARD, OF EAST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH.

1,119,157.  Specification of Letters Patent.  Patented Dec. 1, 1914.

Application filed November 22, 1907. Serial No. 403,299.

*To all whom it may concern:*

Be it known that I, CHARLES L. HIBBARD, a citizen of the United States, and a resident of East Orange, in the county of Essex and State of New Jersey, have invented certain new and useful Improvements in Phonographs, of which the following is a description.

My invention has for its object the provision of improvements in phonographs which are adapted more particularly for use for commercial purposes, although obviously the invention may be used in connection with other types of phonographs.

Among the features of novelty of the present invention are an improved recorder and reproducer support carried by the traveling carriage or carrier arm, and the provision of means for operating said support so as to bring either the recorder or reproducer into operative position with respect to the record surface, or for bringing the parts into such position that both the recording and reproducing styluses are entirely clear of the record surface, so that the record cylinder can be removed from or placed on the mandrel without contacting with either of said styluses, and the traveling carriage can be shifted without injury to either the record or reproducer and recorder. The traveling carriage is provided with a sound conveying tube to which an amplifying device or sound conveying tube may be applied, and the said tube is in communication with sound conveying ducts formed within the frame or support which carries the recorder and reproducer, the arrangement being preferably such that when the recorder is in operative position, there will be a sound passage leading in a straight line through the tube carried by the carriage to the interior of the recorder sound box and the reproducer will be cut out; and when the reproducer is in operative position, a devious or indirect sound passage will lead to the reproducer and the recorder will be entirely out of communication therewith. Indicating means are also provided for showing when the recorder and reproducer are respectively in operative position, and when both are in inoperative position. Means are also provided for locking the end gate which carries the outer bearing for the mandrel shaft, so that the end gate cannot be moved when either the recorder or reproducer is in operative position, the end gate being unlocked when both the recorder and reproducer are in inoperative position, that is, with their styluses clear of the record cylinder. Means are also provided for moving the feed nut from engagement with the feed screw when the recorder and reproducer are in inoperative position. My invention also comprises improved details of construction which will be hereinafter fully set forth and claimed.

Reference is hereby made to the accompanying drawing, of which—

In all of the views corresponding parts are designated by the same reference numerals.

The phonograph shown comprises a mandrel shaft 1 and mandrel 2 mounted thereon, the outer end of the mandrel shaft being formed with a pivot 3 which engages a longitudinally adjustable bearing 4 carried by the end gate 5 and secured in any desired position by the set screw 10. The inner end of the shaft 1 is formed with a tapering shoulder 6, and an extension 7 of reduced diameter, said latter parts being journaled in a bearing 8 of corresponding shape and carried by an upright formed integral with the body or bed plate 9 (see Fig. 7). This form of bearing is advantageous since any play which may be caused by wear between the shaft and its bearings may be taken up by a slight longitudinal movement of the mandrel shaft 1, effected by properly adjusting the pivot block 4 carried by the end gate 5. A spur gear 11 is fixed to the inner end of the shaft 1 and drives the feed screw shaft 12 by means of the gear train 13. The said feed screw shaft 12 is provided with the usual thread for engagement with the feed nut 14 for imparting a progressive forward movement to the sound box carrier arm or traveling carriage 15. This carriage is in the form of a yoke extending transversely with respect to the mandrel and sleeved at its rear upon the rod 16. The feed nut 14 is mounted on the end of a flat spring 17 which is secured to the carriage 15 by the screw 18. This spring is so arranged as to normally hold the feed nut 14 in engagement with the feed screw 12, and means are provided for pressing the spring 17 forward so as to release the feed nut from the feed screw when the recorder and reproducer are in inoperative positions, as will be hereinafter described. The forward end of the carriage 15 rests upon the horizontal rod 19, which is carried by the body 9, and said end is provided with an extension 20, which may be used for manually shifting said carriage.

Figures 5, 6:
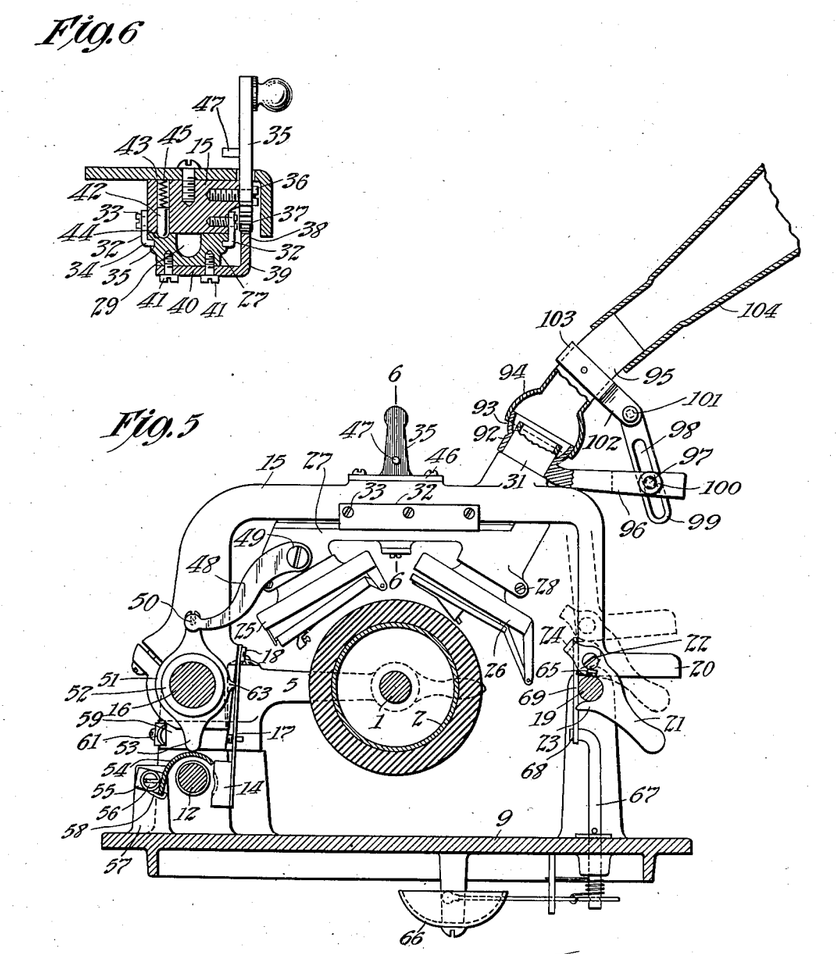
Fig. 5 is a section on line 5—5 of Fig. 1 showing also an improved form of sound tube coupling applied to the traveling carriage.
Fig. 6 is a detail section on line 6—6 of Fig. 5.

The carriage is capable of being raised so as to turn upon the guide rod 16 and be thrown back so as to fully expose the recorder and reproducer for any desired manipulation. Means are provided for locking the carriage in its operative position, said means consisting of a latch 21 pivoted on the screw 22 and provided with a hook 23 which is normally in engagement with the rod 19, as shown in Fig. 5. In this position the latch 21 locks the carriage 15. Upon turning the latch 21 upon its pivot, however, the carriage is unlocked from the rod 19 and may be raised as above described. As soon as the latch 21 clears the rod 19, it falls into such a position that when the carrier arm is returned to the position indicated in dotted lines in Fig. 5, the latch 21 rests upon the upper surface of the rod 19, and the carriage may of course be moved freely upon the guide rod 16. The latch 21 cannot move on its pivot beyond the position shown on account of the engagement of a stop 24 carried by the end of the latch in position to engage the carrier arm.

Figure 2:
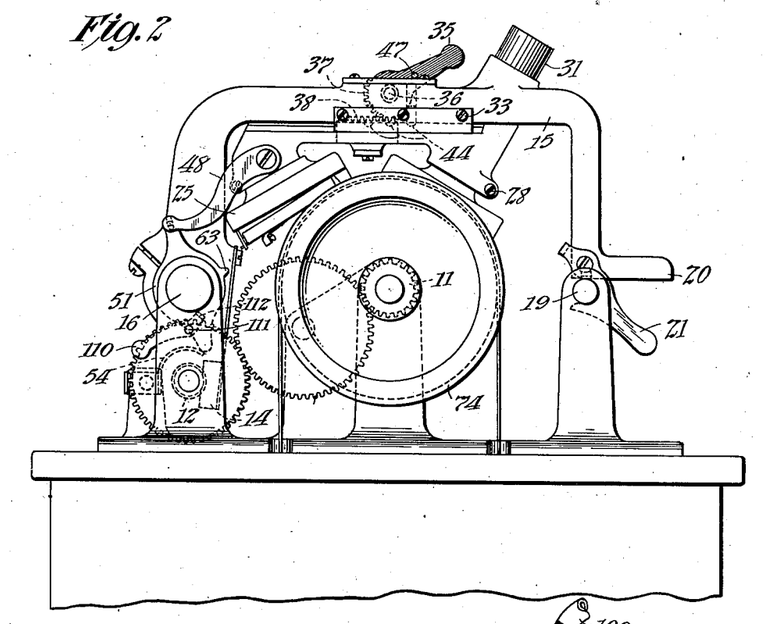
Fig. 2 is an end elevation of the same looking toward the right in Fig. 1.
Figure 3:
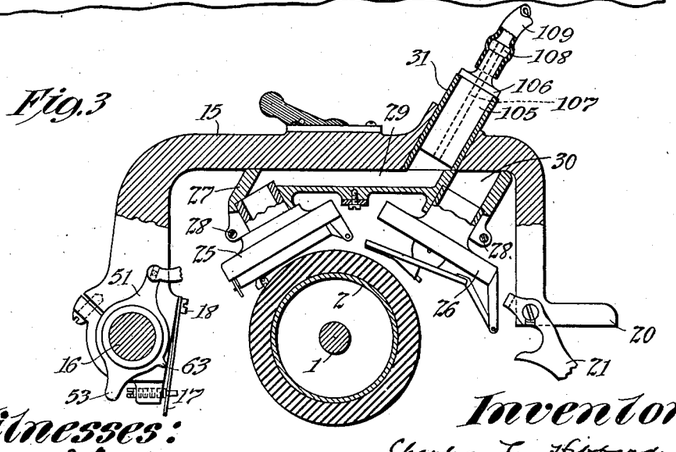
Fig. 3 is a section on line 3—3 of Fig. 1.

The reproducer 25 and recorder 26 may be of any approved construction, but I prefer to use the particular form disclosed in United States Patent No. 855,828 granted June 4, 1907, to Edward L. Aiken. These instruments are carried by a supporting frame or slide 27, being inserted therein as shown in Figs. 2 and 3, and secured by the clamping screws 28. The slide 27, the details of which are shown in Figs. 3 and 6, comprises a body formed with two sound ducts or passages 29 and 30, one of which leads to the reproducer and the other to the recorder. When the reproducer is in operative position, as shown in Fig. 3, the passage 29 is in direct communication with the tube 31, carried by the carriage 15 and adapted to receive the usual amplifying horn or sound conveying tube. When the slide 27 is moved so as to bring the recorder into operative position the sound passage 30 is in direct communication with the tube 31. It will be observed that the arrangement is such that when the recorder is in position there is a direct and straight sound passage through the tube 31 into the sound box of the recorder, so that the sound waves will not be weakened by deflection, whereby the full force of the waves is utilized for cutting the record groove. On the other hand, when the reproducer is in operative position, the air passage between the interior of the sound box and the tube 31 will be somewhat devious whereby certain of the sound waves will be somewhat weakened, thus producing the effect of a tone modifier or purifier for cutting down the strength and improving the quality of the sound waves, as is desirable in instruments of this character. It should furthermore be noted that the sound passages 29 and 30 are entirely separate from each other, and that only one of these passages will be in communication with the tube 31 during the operation of the instrument, whether for recording or reproducing.

The upper surface of the slide 27 and the lower surface of the carrier arm 15, are planed off to fit closely together and prevent the escape of sound waves. These two parts are held in engagement by means of a pair of guide plates 32 which are secured by screws 33 to the carrier arm 15, said plates being formed with horizontal flanges 34 which engage corresponding grooves 35 formed in the side walls of the slide 27. Means for operating the slide and thereby bringing either the recorder or reproducer into operative position as desired, or bringing both out of operative position, are provided, and as shown, consist of a hand lever 35 pivoted on a screw 36 carried by the arm 15, the lower portion of said lever being enlarged to form a toothed sector 37, which engages a rack 38 formed on the flange 39 of a plate 40 secured to the bottom of the slide 27 by screws 41.

Means are provided for holding the slide 27 in three distinct positions, the first of which is the position in which the recorder will be in operative position with respect to the record surface (Fig. 2); the next position of the slide is an intermediate position in which neither the recorder nor reproducer will be in operative position (Fig. 5), and finally there is a position in which the reproducer will be in operative position (Fig. 3). The said means for holding the slide, as shown in Fig. 6, consists of a plug 42 situated in a recess 43 formed in the carrier arm 15. The lower end of this plug is rounded and the slide 27 is formed with rounded depressions 44 adapted to be engaged by the end of the plug 42, a small spring 45 being placed above the plug in order to press it downwardly into engagement with one of said sockets. Said sockets are three in number and are so placed as to receive the plug 42 in each of the three positions of the slide 27, as previously set forth.

In order to indicate to the user the various positions of the slide 27, an indicator plate 46 is preferably secured to the upper side of the arm 15, as shown. This plate is provided with the words "Reproducer", "Off" and "Recorder", and these words are so placed that when the slide is in such position that the recorder is operative with respect to the record, the pin 47 carried by the lever 35 will be opposite the word "Recorder". When the lever 35 is moved so as to bring the pin 47 opposite the word "Off", the reproducer and recorder styluses will both be off the record surface, and when the pin 47 is opposite the word "Reproducer", the reproducer will be in operative position with respect to the record surface. Thus, the user can tell whether the instrument is in suitable position for recording or for reproducing, or for shifting the carriage or changing the record cylinder by merely glancing at the plate 46, and noticing which word the pin 47 indicates.

Figure 1:
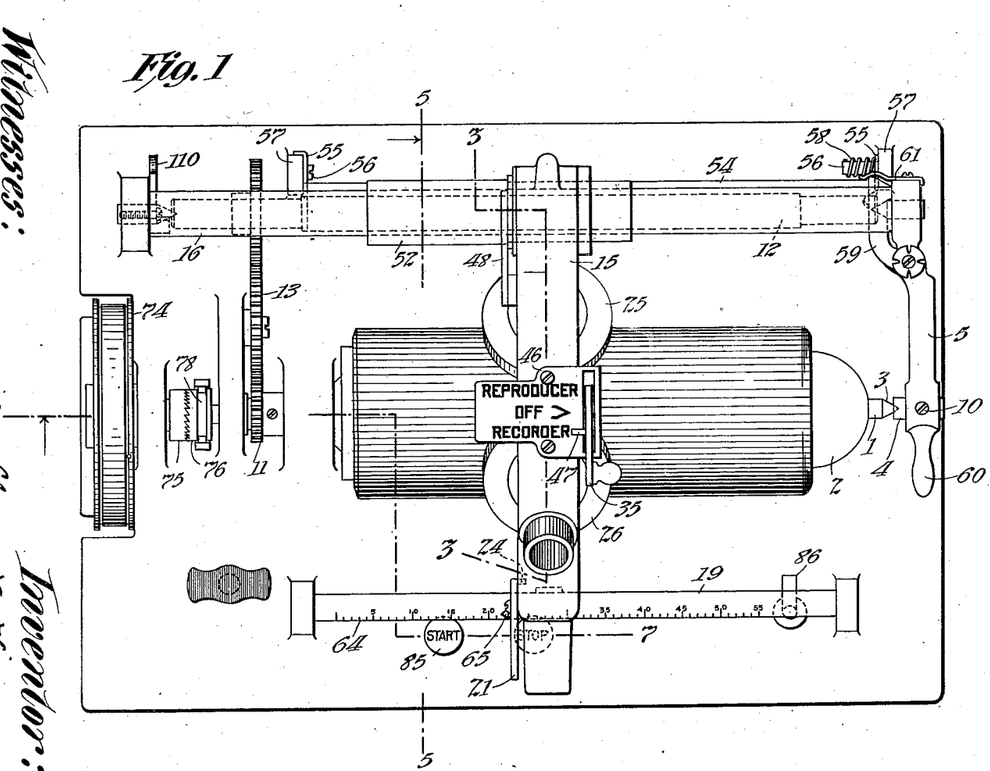
Figure 1 is a plan view of a phonograph constructed in accordance with my invention.
Figure 4:
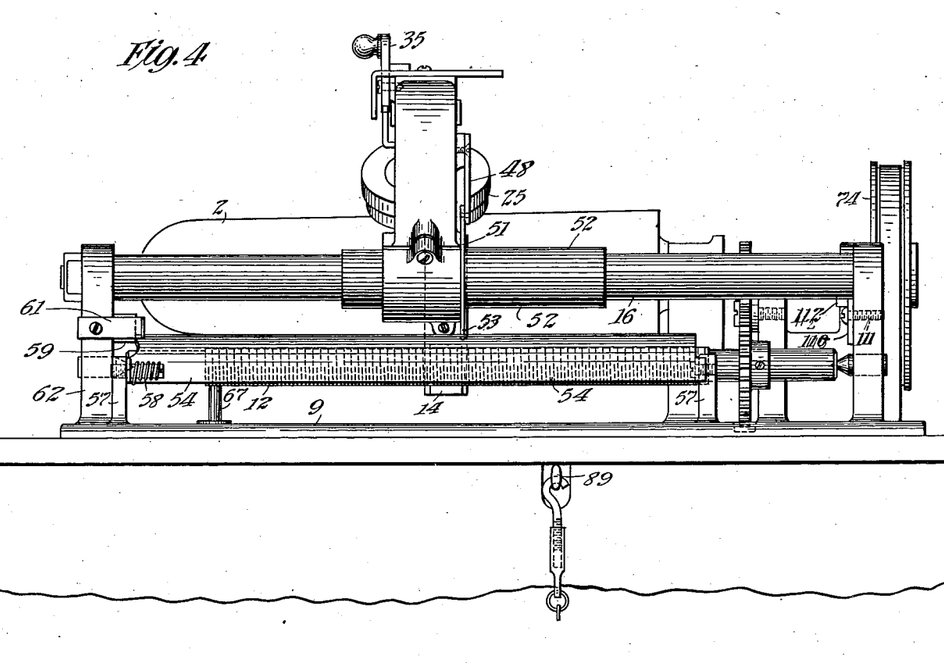
Fig. 4 is a rear elevation.

As I have previously stated the record cylinder should not be removed from or applied to the mandrel except when both the recorder and reproducer are in inoperative position, so that the styluses are removed from the record surface, in which case the pin 47 of the lever 35 will be opposite the word "Off". In order, however, that the user, through carelessness, shall not be able to remove or apply a record unless the parts are in proper position, I have provided means for locking the end gate 5 in its closed position whenever either the reproducer or recorder is in operative position, and for releasing the end gate only when the indicating pin 47 is opposite the word "Off" on the plate 46. These means comprise the following instrumentalities: A link 48 is pivoted at one end on a screw 49, carried by the slide 27, said link being connected at its other end by a pivot pin 50 with an annular member 51. This member is mounted upon the sleeve 52 to which the carrier arm 15 is clamped, and is capable of oscillation thereon, concentric with the guide rod 16. The lower portion of the ring 51 is formed with a cam surface 53, which bears against a longitudinally extending curved plate 54. This plate extends parallel with the guide rod 16 and feed screw 12, so that the ring 51 will be above said plate in any position to which it may be brought by the traveling carriage 15, and said plate is provided with rearwardly extending ears 55 which are pivoted upon screws 56 carried by standards 57 integral with the body 9. The plate 54 is so curved as to partly inclose the feed screw 12 and act as a shield or guard for said screw. A coil spring 58 is applied to said plate 54 in such a way as to tend to move it from the position shown in Fig. 5, to that shown in Fig. 2, and therefore holds it against the cam surface 53 of the ring 51. When in the position of Fig. 2 and Fig. 4, the plate locks the end gate in closed position, by preventing inward movement of the rearward extension 59 of the end gate (see Figs. 1 and 4). The plate 54 will be in locking position at all times except when both the recorder and reproducer styluses are off the record, as shown in Fig. 5, in which case the cam surface 53 of the ring 51 presses the plate 54 down, thereby making it possible for the extension 59 of the end gate 5 to clear the plate 54. A spring 61 is secured to the upright 62 of the body 9, and is adapted to engage the rear end of the extension 59 on the end gate when the latter is in its closed position, as shown in Fig. 1, said spring acting as a latch for said end gate for holding it in its closed position, but said spring releases said extension 59 when pressure is applied to the end gate to open it, the handle 60 being provided for this purpose.

The ring 51, in addition to carrying means for causing the unlocking of the end gate, is also provided with means in the form of a cam surface 63 for pressing the feed nut spring 17, and thereby releasing the feed nut 14 from engagement with the feed screw 12, when the recorder and reproducer are in an off position, as shown in Fig. 5. When either the recorder or reproducer is in an operative position, the ring 51 will be in such position that the feed nut will engage the feed screw.

In order to indicate the position of the recorder or reproducer with respect to the surface of the record cylinder, a scale 64 is attached to or formed upon the front rod 19 and an index finger 65 is applied to the latch 21 in proper position for coöperating with the scale 64. In order to afford a signal to the user that the carrier arm is near the end of the record cylinder, a bell 66 is applied to the body 9, and the same is adapted to be operated by a vertical rock shaft 67, which is journaled within the body 9, and is provided with a rearward extension or projection 68, which is in the path of a pawl 69 (see Fig. 5), which is pivoted to the forward portion of the arm 15.

Figure 7:
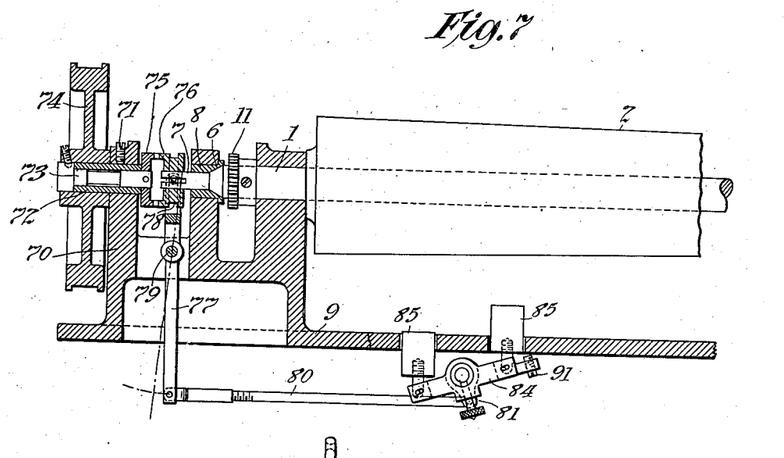
Fig. 7 is a section on line 7—7 of Fig. 1 and shows the means for starting and stopping the mandrel.
Figures 8, 9:
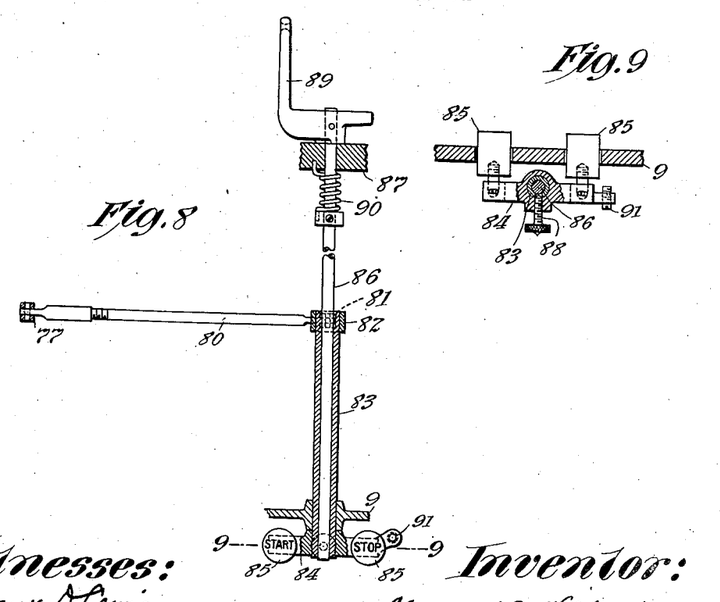
Fig. 8 is a plan view partly in section of certain parts of the starting and stopping mechanism of Fig. 7.
Fig. 9 is a section on line 9—9 of Fig. 8.

I will now describe the mechanism for starting and stopping the rotation of the mandrel shaft 1. Within the upright 70 of the base 9, and secured by a set screw 71, is a sleeve 72 which forms a bearing for a shaft 73 upon one end of which is secured a driving pulley 74 which may be continuously operated by a belt from any suitable motor, such as an electric motor, and upon the opposite end of the shaft 73 is secured a clutch member 75. Upon the reduced end of the shaft 1 is a slidable clutch member 76, having teeth adapted to engage the teeth of the clutch member 75, in the usual manner (see Fig. 1), in which case the shaft 1 will be driven by the shaft 73. The clutch member 76 is adapted to be operated by a lever 77, pivoted at 79 and formed with a fork at its upper end, which engages a groove 78 formed in the clutch member 76. Pivoted to the lower end of the lever 77 is a link 80 which at its opposite end is pivoted to an arm 81 projecting downward from a sleeve 82 secured upon one end of the tubular shaft 83. The link 80, as shown, is composed of a rod threaded within a sleeve whereby the length of the link may be adjusted as will be evident. Upon the forward end of the hollow shaft 83 is secured a beam 84, and connected to the respective ends of the said beam are a pair of buttons 85, which may be marked respectively "Start" and "Stop" (see Fig. 8). The parts described are so arranged that upon depressing the left hand button as shown in Fig. 7, the link 80 will be drawn toward the right, and the upper end of the lever 77 moved to the left thereby bringing the clutch member 76 into engagement with the clutch member 75. Upon depressing the right hand button the clutch member 76 will be brought out of engagement with the clutch member 75, and the mandrel will therefore be stopped. These buttons are adapted to be operated by the finger of the person using the instrument. In some cases, however, it is desirable to effect the starting and stopping of the mandrel by a pedal or foot device, and in order that the mandrel may be operated according to either of these methods, I provide a shaft 86 which is sleeved within the holow shaft 83 and extends rearward through the cabinet of the machine, being sleeved within a downwardly extending lug 87, which is integral with the body 9. The shaft 86 may be operatively connected with the sleeve 83 by a thumb screw 88, which is threaded in the beam 84, and is adapted to pass through an opening in the sleeve 83, so as to act as a set screw for uniting the shaft 86 with the said sleeve and beam. When the screw 88 is in the position of Fig. 9, the sleeve 83 cannot be operated by the shaft 86. This shaft may be connected to any kind of an operating device and for this purpose I attach to the rear end of the shaft an angular arm 89. A coil spring 90 is applied to the shaft 86 in such a way as to tend to rotate the shaft in the direction for stopping the rotation of the mandrel. When the shaft is operated to start the mandrel the spring is placed under elastic stress, and upon the shaft 86 being released the spring 90 restores the shaft 86 to its original position, thereby separating the clutch members 76 and 75 and causing the mandrel to cease rotation. A screw 91 is threaded in one end of the beam 84 and acts as an adjustable stop for the same, by engagement with the body 9.

The upper end of the sound conveying tube 31 forms a nipple upon which may be placed the combined coupling and horn support which comprises a body 92 having an opening adapted to fit snugly upon the end of the tube 31, and a rounded annular flange 93 adapted to coöperate with a similar flange 94 carried by the tube 95 forming therewith a hollow ball and socket joint. The body 92 is also provided with an arm 96 rigid therewith and provided with a screw 97, which passes through a slot 98 formed in a link 99. A nut 100 is provided for drawing the head of the screw against the link 99, thereby clamping the link to said arm 96. One end of the link 99 is pivoted at 101 to an arm 102 extending downward from a ring 103, which surrounds and is pinned to the tube 95. The parts described provide means for angularly adjusting the tube 95 with respect to the body 92 and locking the same together in any desired position of adjustment. The tube 95 may be used as a nipple upon which to place an amplifying horn 104 or other sound conveying tube, or, if desired, the tube 95 may be integral with such horn or sound conducting tube, or may be secured thereto in any desired manner.

The coupling just described is preferably used in connection with an amplifying horn 104 for recording or reproducing. In case a listening tube is used, I prefer to connect the same with the tube 31 by the device shown in Fig. 3 which consists of a plug 105 fitting closely within said tube 31 and having a shoulder 106 adapted to engage the end thereof. The plug is formed with a central bore 107 and a nipple 108 upon which the end of a rubber tube 109 may be placed. This device fills up the space within the tube 31, thereby preventing resonance and purifying the tone of the instrument during reproduction. It may, of course, be entirely removed when the phonograph is used for recording.

Inasmuch as the position of a given record upon the mandrel depends upon the relative sizes of the bore of the record and the exterior of the mandrel, owing to the tapered form of these parts, a change of temperature may cause a record when the attempt is made to reproduce it to assume a position with respect to the mandrel in which it is farther to the left than when the record was made, so that the reproducer carriage must be capable of occupying a position farther to the left than that in which it was started when the record was made (on either the same or a similar machine). In order that this may be always possible, I provide a movable stop 110, which normally occupies a position, (see Figs. 1, 2 and 4) in which it is in the path of the sleeve 52, to which the carriage is secured, and therefore determines the point upon the record surface at which the record may be started. This stop, as shown, is in the form of a lever pivoted on a screw 111, secured to the frame, and having a lug 112, said lever hanging by gravity in the position of Fig. 2, wherein the short end of the lever abuts against the rod 16. In this position the lug 112 is in the path of the sleeve 52, when moved toward the left. Whenever it is necessary to move the said sleeve farther toward the left, the lever 110 may be turned on its pivot, until the lug 112 clears the sleeve 52, in which case, the sleeve may be moved until it contacts with that part of the frame which carries the end of the rod 16. As soon as the sleeve 52 is fed far enough toward the right, the lever 110 will drop into its normal position, in which it acts as a stop for said sleeve.

Having now described my invention, what I claim is:

1. In a phonograph or talking machine, the combination of a support for a record tablet and means for rotating the same, a frame carrying a recorder and a reproducer having separate sound boxes arranged on opposite sides of the axis of said support, and a second support along which said frame is slidable in a direction transverse to the axis of the record tablet support for bringing either said reproducer or said recorder into operative engagement with the record tablet surface, substantially as described.

2. In a phonograph or talking machine, the combination of a support for a record tablet and means for rotating the same, a hollow frame, a recorder comprising a sound box in communication with the interior of said frame, a reproducer comprising a sound box separate and distinct from that of said recorder, said reproducer sound box being also in communication with the interior of said frame, a traveling carriage and means for movably supporting the said frame upon said carriage in such a manner as to permit either the recorder or reproducer to be brought into engagement with the record surface as desired, substantially as set forth.

3. In a phonograph or talking machine, the combination of a record tablet support and means for rotating the same, a carriage movable transversely with respect to said record surface, a sound conveying tube and a hollow frame carried by said carriage, a recorder and a reproducer having separate sound boxes carried by said hollow frame with their sound boxes in communication with the interior thereof and said interior being in communication with the tube carried by said carriage, and means for shifting said frame with respect to said carriage for bringing said recorder and reproducer into and out of operative position with respect to the record surface, substantially as set forth.

4. In a phonograph or talking machine, the combination of a sound record tablet support and means for rotating the same, a frame, a reproducer and a recorder having separate sound boxes, said frame having sound passages formed therein, said passages being separate from and out of communication with each other and leading respectively to the sound boxes of the recorder and reproducer, a sound conveying tube, and means for movably supporting said frame with respect to said tube whereby either of said sound passages may be brought into connection with said sound tube to the exclusion of the other, substantially as set forth.

5. In a phonograph or talking machine, the combination of a support for a record tablet and means for rotating the same, a carriage movable in a direction transverse to the direction of movement of the record surface, a frame carrying a recorder and a reproducer having separate sound boxes, said frame having sound passages formed therein, separate from and out of communication with each other, and leading respectively to the sound boxes of the recorder and reproducer, and said frame being slidably mounted upon said carriage, a sound conveying tube and means for so sliding said frame with respect to said carriage that either of said sound passages may be brought into connection with said sound tube to the exclusion of the other, substantially as set forth.

6. In a phonograph or talking machine, the combination of a support for a record tablet and means for rotating the same, a carriage movable in a direction transverse to the direction of movement of the record surface, a slide mounted upon said carriage for supporting the recorder and reproducer, means for moving said slide with respect to said carriage, means for guiding said slide in such movement, so arranged as to prevent escape of air between said slide and carriage, and indicating means for designating the position of said slide with respect to said carriage, substantially as set forth.

7. In a phonograph or talking machine, the combination of a rotatable record support, traveling carriage, and slide carried by said carriage, said carriage being provided with a sound conveying tube stationary relatively to said carriage, and said slide being provided with a recorder and a sound duct leading into the sound box thereof and being movable in a line lying in a plane transverse to the axis of the record support for moving said recorder into and out of operative position with respect to the record surface, said sound duct being so situated as to form with said sound tube a straight direct path into the sound box of the recorder when the latter is in operative position with respect to the record surface, substantially as set forth.

8. In a phonograph or talking machine, the combination of a traveling carriage and slide carried thereby, said carriage being provided with a sound conveying tube and said slide being provided with a reproducer and a sound duct leading into the sound box thereof, said sound duct being so situated as to form with said sound conveying tube an indirect or devious path into the sound box of the reproducer when the latter is in operative position with respect to the record surface, substantially as set forth.

9. In a phonograph or talking machine, the combination of the traveling carriage having a sound conveying tube, a hollow frame carried by and movable with respect to said carriage, a recorder and a reproducer having separate sound boxes and sound passages formed in said frame, said passages being separate from and out of communication with each other and leading respectively to the sound boxes of the recorder and reproducer, and being so formed as to provide a direct path to the recorder when the same is in operative position, and an indirect path to the reproducer when the latter is in operative position, substantially as set forth.

10. In a phonograph or talking machine, the combination of the rotating mandrel, traveling carriage and pivoted end gate carrying a bearing for the outer end of the mandrel, a plate extending along the path of said carriage and normally locking the end gate in closed position, and means carried by said carriage for engaging said plate to unlock the end gate, substantially as set forth.

11. In a phonograph or talking machine, the combination of the rotating mandrel, traveling carriage and pivoted end gate carrying a bearing for the outer end of the mandrel, a movable support for the reproducer or recorder carried by said carriage, means for locking the end gate in closed position, and means actuated by the movement of said support for unlocking the end gate, substantially as set forth.

12. In a phonograph or talking machine, the combination of the rotating mandrel, traveling carriage and pivoted end gate carrying a bearing for the outer end of the mandrel, a movable support for the reproducer or recorder, means for locking the end gate in closed position and means actuated by the movement of said support and operating to simultaneously move the recorder or reproducer out of engagement with the record and unlock the end gate, substantially as set forth.

13. In a phonograph or talking machine, the combination of the mandrel, feed screw, traveling carriage and pivoted end gate carrying a bearing for the outer end of the mandrel, a curved plate forming a guard for the feed screw and normally locking the end gate in closed position, and means for moving said plate to unlock the end gate, substantially as set forth.

14. In a phonograph or talking machine, the combination of the rotatable record support, feed screw, traveling carriage and feed nut carried thereby, a reproducer and a recorder having separate sound boxes, a supporting device for said reproducer and recorder carried by and movable with respect to said carriage, means for moving said device in a straight line extending transversely with respect to said record support, and means actuated by the movement of said device relatively to said record support for causing the disengagement of the feed nut from the feed screw, substantially as set forth.

15. In a phonograph or talking machine, the combination of the mandrel, traveling carriage, pivoted end gate carrying a bearing for the outer end of the mandrel, means for locking the end gate in closed position, a cam carried by said carriage for unlocking the end gate, and means for operating said cam, substantially as set forth.

16. In a phonograph or talking machine, the combination of the traveling carriage and slide carried thereby, means for operating said slide to progress the same with respect to said carriage in a straight line, and locking means for holding said slide in fixed position with respect to said carriage, said means comprising a spring operated pin in one member co-acting with spaced recesses in the other member, substantially as set forth.

17. In a phonograph or talking machine, the combination with the rotating mandrel, traveling carriage and the stylus carried thereby, of means for preventing the removal of a record from or the insertion of a record upon said mandrel, a movable plate extending along the path of said carriage positioned to render said preventing means effective or ineffective, and means carried by said carriage for moving said plate to render said preventing means effective or ineffective, substantially as set forth.

18. In a phonograph or talking machine, the combination with the rotating mandrel, traveling carriage and the stylus carried thereby, of means for locating said stylus in "on" or "off" position with respect to the record on said mandrel, means for preventing the removal of a record from or the insertion of a record upon said mandrel, a movable plate extending along the path of said carriage positioned to render said preventing means effective, and means carried by said carriage and movable with said stylus-locating means for moving said plate to render ineffective said preventing means when said stylus is located in "off" position, substantially as set forth.

19. In a phonograph or talking machine, the combination with the rotating mandrel, traveling carriage and the stylus carried thereby, of means for preventing the removal of a record from or the insertion of a record upon said mandrel, a support for said stylus movable with respect to said carriage, and means actuated by the movement of said support with respect to said carriage for rendering said preventing means effective or ineffective, substantially as set forth.

20. In a phonograph or talking machine, the combination of the mandrel, feed screw, traveling carriage, means for preventing the removal of a record from or the insertion of a record upon said mandrel, a curved plate forming a guard for the feed screw and normally acting to hold said preventing means in operative position, and means for moving said plate to render said preventing means ineffective, substantially as set forth.

21. In a phonograph or talking machine, the combination of the mandrel, traveling carriage, a slide carried by said carriage and movable with respect thereto, a stylus carried by said slide and adapted to be located with respect to a record on said mandrel by such relative movement of said slide, means for preventing the removal of a record from or the insertion of a record upon said mandrel, and means operated by movement of said slide relative to said carriage for rendering said preventing means effective or ineffective, substantially as set forth.

22. In a phonograph or talking machine, the combination of the mandrel, traveling carriage, a slide carried by said carriage and movable with respect thereto, a stylus carried by said slide and adapted to be located with respect to a record on said mandrel by such relative movement of said slide, a feed screw, a pivoted guard therefor, and means for oscillating said guard by movement of said slide, substantially as set forth.

23. In a phonograph or talking machine, the combination of the mandrel, traveling carriage, means for preventing the removal of a record from or the insertion of a record upon said mandrel, a cam carried by said carriage and movable to render said preventing means effective or ineffective, and means for thus moving said cam, substantially as set forth.

24. In a phonograph or talking machine, the combination with a support for a record tablet, means for rotating the same, and an arm having a sound conveying passage therein, said arm and record support having a relative feeding movement in a direction transverse to the direction of the rotary movement of the record surface, of a slide mounted upon said arm, said slide carrying two sound boxes each having a diaphragm mounted therein, the sound passages of the sound boxes being separate and out of communication with each other, and means for so shifting said slide with respect to said arm that the sound passage of either of said sound boxes may be brought into communication with said sound conveying passage of said arm to the exclusion of the other, substantially as set forth.

25. In a phonograph or talking machine, the combination of a support for a record tablet and means for rotating the same, a carriage movable in a direction transverse to the direction of movement of the record surface, a slide mounted upon said carriage, said slide carrying two sound boxes each having a diaphragm mounted therein, the sound passages of the sound boxes being separate and out of communication with each other, a sound conveying tube mounted on said carriage, and means for so shifting said slide with respect to said carriage that the sound passage of either of said sound boxes may be brought into communication with said sound conveying tube to the exclusion of the other, substantially as set forth.

26. In a phonograph or talking machine, the combination of a support for a record tablet and means for rotating the same, a carriage having a sound conveying passage therein and movable in a direction transverse to the movement of the record surface, and a slide supporting a plurality of sound boxes each provided with a diaphragm, the said slide being movable upon said carriage so as to bring either sound box and diaphragm into operative position and being supported by said carriage in close contact therewith so that an air tight connection is formed between the sound passages of said sound boxes and said carriage, substantially as set forth.

27. In a phonograph, the combination with a carriage provided with a way, of a plurality of sound boxes movably mounted on said way and respectively adapted to be brought into operative position.

28. In a phonograph, the combination of a carriage provided with a way, a cover for said way having sound-conveying connections, and a plurality of sound boxes mounted on said way beneath said cover and respectively adapted to be brought into register with said connections.

29. In a phonograph, the combination of a carriage provided with a way; two sound boxes movably mounted on said way and provided with a rack, a sound box being operatively disposed when occupying a position on said way intermediate between the ends thereof; and a member rotatably mounted on said carriage and provided with gear teeth engaging such rack, whereby either sound box may be operatively positioned as desired.

30. In a phonograph or talking machine, the combination of a support for a record tablet and means for rotating the same, a carriage movable in a direction transverse to the direction of movement of the record surface, a slide mounted upon said carriage, said slide carrying two sound boxes each having a diaphragm mounted therein, a sound conveying tube mounted on said carriage, and means for so shifting said slide with respect to said carriage that either of said sound boxes may be brought into communication with said sound conveying tube to the exclusion of the other, substantially as set forth.

31. In a phonograph or talking machine, the combination of a support for a record tablet, a second support provided with a way, and a plurality of sound boxes movably mounted on said way and respectively adapted to be brought into operative position with respect to the surface of the record tablet, substantially as described.

This specification signed and witnessed this 21st day of November, 1907.

CHAS. L. HIBBARD.

Witnesses:
  FRANK D. LEWIS,
  CHAS. F. ROBSON.